US012445448B2

(12) United States Patent
Osborn et al.

(10) Patent No.: US 12,445,448 B2
(45) Date of Patent: Oct. 14, 2025

(54) COMPUTER-BASED SYSTEMS AND/OR COMPUTING DEVICES PROGRAMMED FOR ROLE-BASED AUTHENTICATION DURING CUSTOMER SERVICE SESSIONS; AND METHODS OF USE THEREOF

(71) Applicant: Capital One Services, LLC, McLean, VA (US)

(72) Inventors: Kevin Osborn, Newton Highlands, MA (US); Francis Ogbennah, Arlington, VA (US); Anita Eradla, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 201 days.

(21) Appl. No.: 18/339,898

(22) Filed: Jun. 22, 2023

(65) Prior Publication Data

US 2024/0430263 A1 Dec. 26, 2024

(51) Int. Cl.
*G06F 21/00* (2013.01)
*H04L 9/40* (2022.01)

(52) U.S. Cl.
CPC ........ *H04L 63/102* (2013.01); *H04L 63/0853* (2013.01); *H04L 63/105* (2013.01); *H04L 63/1483* (2013.01)

(58) Field of Classification Search
CPC . H04L 63/102; H04L 63/0853; H04L 63/105; H04L 63/1483; H04L 63/0838
See application file for complete search history.

(56) References Cited

U.S. PATENT DOCUMENTS

| 8,392,978 | B2 | 3/2013 | Grove et al. |
| 9,813,236 | B2 | 11/2017 | Buer |
| 12,155,641 | B1* | 11/2024 | Soccorsy ............... H04L 63/102 |
| 2007/0118745 | A1* | 5/2007 | Buer ....................... G06F 21/34 |
| | | | 713/168 |
| 2018/0205416 | A1* | 7/2018 | Ehrensvärd .............. H04B 5/26 |
| 2020/0374121 | A1* | 11/2020 | Momchilov .......... H04L 9/0825 |
| 2021/0158315 | A1* | 5/2021 | Phillips ................. H04W 12/06 |
| 2023/0421583 | A1* | 12/2023 | Olden ................. H04L 63/1416 |

OTHER PUBLICATIONS

International Search Report and Written Opinion from International Application No. PCT/US2024/030828 dated Sep. 4, 2024.

* cited by examiner

*Primary Examiner* — Kendall Dolly
(74) *Attorney, Agent, or Firm* — Greenberg Traurig, LLP

(57) ABSTRACT

A computer-implemented method includes detecting a communication session established between a first computing device of a first user and a second computing device of a second user; generating session identification information for the communication session; detecting a triggering condition during the communication session to verify an identity of the first user; causing the second computing device to instruct the first user to interact a smart transaction card with the first computing device such that a one-time data item is transmitted from the smart transaction card to an application executing on the first computing device, the one-time data item dynamically generated by the smart transaction card, where the first user is authenticated via the application based at least in part on the level of authentication and the one-time data item; generating a verification token for the communication session, the authentication result stored in association with the session information.

18 Claims, 11 Drawing Sheets

COMPUTER-BASED SYSTEMS AND/OR COMPUTING DEVICES PROGRAMMED FOR ROLE-BASED AUTHENTICATION DURING CUSTOMER SERVICE SESSIONS; AND METHODS OF USE THEREOF

TECHNICAL FIELD

The present disclosure generally relates to computer-based methods and systems for role-based authentication for communication sessions. In particular, the present disclosure relates to computer-based methods and systems for authentication a caller or an entity representative during a communication session using a physical token.

BACKGROUND

Call center services may be provided by service providers to enable users to access, modify, delete or otherwise control their accounts. For security purposes and to otherwise support accounts, call centers may store sensitive customer information, such as social security numbers, account numbers, account balances, email addresses, phone numbers, postal addresses and the like. Thus, from a security standpoint call centers may be the riskiest areas of an enterprise because call center sessions may expose sensitive customer information to malicious third parties. Up to 80% of the calls received on any given day at customer call centers are from fraudulent callers attempting to improperly gain access to customer accounts.

SUMMARY

In some embodiments, the present disclosure provides an exemplary technically improved computer-based method that includes detecting, by one or more processors, a communication session established between a first computing device of a first user and a second computing device of a second user, the communication session initiated by the first user, where the second user is associated with an entity; generating, by the one or more processors, session identification information for the communication session, the session identification information including at least a session ID; detecting, by the one or more processors, a triggering condition during the communication session to verify an identity of the first user; assessing, by the one or more processors, a risk metric associated with the triggering condition to determine a level of authentication for verifying the identity of the first user; associating, by the one or more processors, the level of authentication with the session information; causing, by the one or more processors, the second computing device to instruct the first user to interact a smart transaction card with the first computing device such that a one-time data item is transmitted from the smart transaction card to an application executing on the first computing device, the one-time data item dynamically generated by the smart transaction card, wherein the first user is authenticated via the application based at least in part on the level of authentication and the one-time data item; receiving, by the one or more processors, an indication when the first user is successfully authenticated; generating, by the one or more processors, a verification token for the communication session, the authentication result stored in association with the session information; and transmitting, by the one or more processors, the verification token to both the first computing device and the second computing device.

In some embodiments, the present disclosure provides an exemplary technically improved computer-based method that includes detecting, by one or more processors, a communication session established between a first computing device of a first user and a second computing device of a second user, the communication session initiated by the first user, where the first user is associated with an entity; generating, by the one or more processors, session identification information for the communication session, the session identification information including at least a session ID; detecting, by the one or more processors, a triggering condition during the communication session to verify an identity of the first user; causing, by the one or more processors, the first computing device to instruct the first user to interact a smart transaction card with the first computing device such that a one-time data item is transmitted from the smart transaction card to an application executing on the first computing device, the one-time data item dynamically generated by the smart transaction card, where the first user is authenticated via the application based at least in part on the one-time data item; receiving, by the one or more processors, an indication when the first user is successfully authenticated; generating, by the one or more processors, a verification token for the communication session, the authentication result stored in association with the session information; and transmitting, by the one or more processors, the verification token to both the first computing device and the second computing device.

In some embodiments, the present disclosure provides an exemplary technically improved computer-based system that includes a non-transient computer memory, storing software instructions; at least one processor of a computing device associated with a user; where, when the at least one processor executes the software instructions, the first computing device is programmed to: detect a communication session established between a first computing device of a first user and a second computing device of a second user, the communication session initiated by the second user, where the first user is associated with an entity; generate session identification information for the communication session, the session identification information including at least a session ID; detect a triggering condition during the communication session to verify an identity of the first user; cause the first computing device to instruct the first user to interact a smart transaction card with the first computing device such that a one-time data item is transmitted from the smart transaction card to an application executing on the first computing device, the one-time data item dynamically generated by the smart transaction card, where the first user is authenticated via the application based at least in part on the one-time data item; receive an indication when the first user is successfully authenticated; generate a verification token for the communication session, the authentication result stored in association with the session information; and transmit the verification token to both the first computing device and the second computing device.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 1 is a block diagram illustrating an exemplary computer-based system for role-based authentication of a user and/or an entity representative, according to one or more embodiments of the present disclosure.

DETAILED DESCRIPTION

Figure 1:
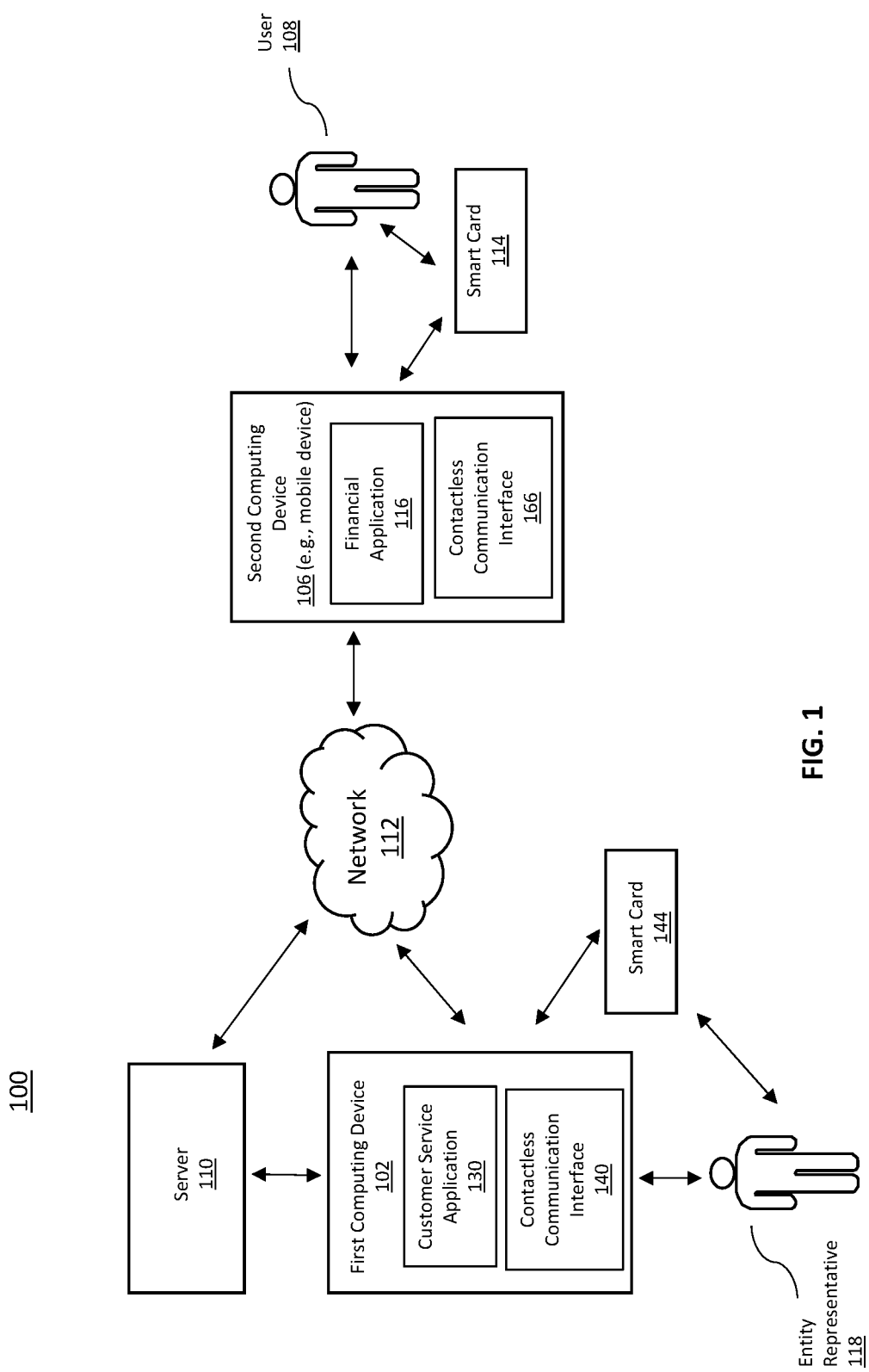

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

As used herein, the term "customer", "client" or "user" shall have a meaning of at least one customer or at least one user respectively.

As used herein, the term "mobile computing device", "user device" or the like, may refer to any portable electronic device that may include relevant software and hardware. For example, a "mobile computing device" can include, but is not limited to, any electronic computing device that is able to among other things receive and process alerts from a customer or a financial entity including, but not limited to, a mobile phone, smart phone, or any other reasonable mobile electronic device that may or may not be enabled with a software application (App) from the customer's financial entity.

In some embodiments, a "mobile computing device" or "user device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, credit offers, credit requests, and credit terms from a customer or financial institution.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

FIGS. 1 through 11 illustrate systems and methods for improved role-based authentication for ongoing communication sessions via, for example, a physical token, in accordance with at least some embodiments of the present disclosure. In some embodiments, the system may be configured to determine a level of authentication based on a communication session between a customer or a representative, prompt the customer or representative to tap their respective physical token to trigger a respective authentication process based on the determined level of authentication, and responsive to the customer or representative being successfully authenticated, transmit a verification token to both the customer and the representative such that they may verify each other's identity. The following embodiments provide technical solutions and technical improvements that overcome technical problems, drawbacks and/or deficiencies in at least one technical field involving securely authenticating the identity of a customer and/or an entity representative during an ongoing communication session. As explained in more detail below, the present disclosure provides a technically advantageous computer architecture that improves speed, efficiency and security in authenticating an account holder or an entity representative during a communication session. In some embodiments, using multiple authentication steps that incorporate various communication channels (i.e., phone call, financial application, etc.) provide further security during to the disclosed systems and methods.

FIG. 1 is a block diagram illustration of an exemplary system 100 used to implement one or more embodiments of the present disclosure. The components and arrangements shown in FIG. 1 are not intended to limit the disclosed embodiments as the components used to implement the disclosed processes and features may vary. In accordance with disclosed implementations, the system 100 may include a server 110 in communication with a first computing device 102 associated with an entity representative 118 of an entity and a second computing device 106 associated with a user 108 via a network 112. In some embodiments, the system 100 includes a smart card 114 associated with the user 108. In some embodiments, the system 100 also includes a smart card 144 associated with an entity representative 118.

Network 112 may be of any suitable type, including individual connections via the internet such as cellular or Wi-Fi networks. In some embodiments, network 112 may connect participating devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Server 110 may be associated with the entity. In some embodiments, the entity may be a financial institution. For example, server 110 may manage individual user accounts or process financial transactions. In some embodiments, the server 110 may include one or more logically or physically distinct systems.

In some embodiments, the server 110 may include hardware components such as a processor (not shown), which may execute instructions that may reside in local memory and/or transmitted remotely. In some embodiments, the processor may include any type of data processing capacity, such as a hardware logic circuit, for example, an application specific integrated circuit (ASIC) and a programmable logic, or such as a computing device, for example a microcomputer or microcontroller that includes a programmable microprocessor.

Examples of hardware components may include one or more processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the first computing device 102 may be associated with the entity representative 118 associated with the entity. In some embodiments, the first computing device 102 may generally include at least computer-readable non-transient medium, a processing component, an Input/Output (I/O) subsystem and wireless circuitry. In some embodiments, these components may be coupled by one or more communication buses or signal lines. In some embodiments, the first computing device 102 may include a microprocessor, a memory, a contactless communication interface having a communication field and a display. The first computing device 102 may also include means for receiving user input, such as a keypad, touch screen, voice command recognition, a stylus, and other input/output devices, and the display may be any type of display screen, including an LCD or LED display. In some embodiments, the first computing device 102 may be, without limitations, a desktop computer, a kiosk, an information station, a booth, an ordering station, a countertop computer display, a laptop computer, a tablet, or other computing hardware.

In some embodiments, wireless circuitry may be used to send and receive information over a wireless link or network to one or more other devices' suitable circuitry such as an antenna system, an RF transceiver, one or more amplifiers, a tuner, one or more oscillators, a digital signal processor, a CODEC chipset, memory, etc. The wireless circuitry may use various protocols, e.g., as described herein.

In some embodiments, the first computing device 102 may include a software application 130 related to or affiliated with the entity and the entity-issued smart card 144 and/or a web browser to view data received from the network 112. In some embodiments, the first computing device 102 includes a contactless communication interface 140. In some embodiments, the contactless communication interface 140 may be any short-range wireless communication interface, such as near field communication (NFC) and radio-frequency identification (RFID). In some embodiments, the contactless communication interface 140 may be a NFC interface compliant with the ISO 18092/ECMA-340 standard. In some embodiments, this contactless communication interface 140 may allow data communication with the smart card 114 when the smart card 144 is within the contactless communication interface's communication field. In some embodiments, when the smart card 144 is within data communication range of the first computing device 102, the smart card 144 may synchronize the value of a counter stored in its memory with a counter stored by the first computing device 102. Further, in some embodiments, the smart card 144 may transmit a unique URL to the first computing device 102. In some embodiments, the contactless communication interface 140 may be integrated into the first computing device 102. In some embodiments, the contactless communication interface 140 may be a separate component that is connected to the first computing device 102 via, for example, a direct or wireless connection. In some embodiments, the first computing device 102 may be installed in a commercial establishment, such as an office, store, restaurant, or other work site.

In some embodiments, the first computing device 102 may have data connectivity to a network, such as the Internet, via a wireless communication network, a cellular network, a wide area network, a local area network, a wireless personal area network, a wide body area network, or the like, or any combination thereof. In some embodiments, through this connectivity, the first computing device 102 may communicate with a server 110. For example, in some embodiments, the second computing device 106 may synchronize the counter stored in its memory with the server 110 and may transmit the unique URL received from the smart card 144 to the server 110 (e.g., the first computing device 102 may open the unique URL in a web browser or the customer service software application 130).

In some embodiments, the first computing device 106 may include an application such as the customer service application 130 (or application software) associated with the entity. In some embodiments, the customer service application 130 may include program code (or a set of instructions) that performs various operations (or methods, functions, processes, etc.), as further described herein.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the customer service application 130 may enable entity representatives to interact with the entity, as well as access, view, and/or manage an existing financial account of entity customers. For example, in some embodiments, the customer service application 130 may allow the entity representative 118 to request or start a communication session with an user 108. Additionally, in some embodiments, the customer service application 130 may allow the entity or the entity representative 118 to communicate with the user 108. For example, in some embodiments, the entity representative 118 may send messages or push notifications to the user 108 via the customer service application 130.

It should be apparent that the architecture described is only one example of an architecture for the first computing device 102, and that the first computing device 102 can have more or fewer components than shown, or a different configuration of components. The various components described above can be implemented in hardware, software, or a combination of both hardware and software, including one or more signal processing and/or application specific integrated circuits.

In some embodiments, the second computing device 106 may be associated with the user 108 who is authorized to use an electronic account (e.g., an account holder). In some embodiments, the second computing device 106 may be a mobile computing device. In some embodiments, the second computing device 106 may generally include at least computer-readable non-transient medium, a processing component, an Input/Output (I/O) subsystem and wireless circuitry. In some embodiments, these components may be coupled by one or more communication buses or signal lines. In some embodiments, the second computing device 106 may include a microprocessor, a memory, a contactless communication interface having a communication field, and a display. In some embodiments, the second computing device 106 may also include means for receiving user input, such as a keypad, touch screen, voice command recognition, a stylus, and other input/output devices. In some embodiments, the display may be any type of display screen, including an LCD or LED display. In some embodiments, exemplary portable communication devices include, without limitation, smartphones, laptop computers, tablet computers, a personal digital assistant, a palmtop computer, or other portable computing device.

In some embodiments, wireless circuitry may be used to send and receive information over a wireless link or network to one or more other devices' suitable circuitry such as an antenna system, an RF transceiver, one or more amplifiers, a tuner, one or more oscillators, a digital signal processor, a CODEC chipset, memory, etc. The wireless circuitry may use various protocols, e.g., as described herein.

In some embodiments, the second computing device 106 may include a software application related to or affiliated with the entity, the smart card 114 and/or a web browser to view data received from the network connection.

In some embodiments, the second computing device 106 includes a contactless communication interface 166. In some embodiments, the contactless communication interface 166 may be any short-range wireless communication interface, such as near field communication (NFC) and radio-frequency identification (RFID). In some embodiments, the contactless communication interface 166 may be a NFC interface compliant with the ISO 18092/ECMA-340.

In some embodiments, this contactless communication interface 166 may allow data communication with the smart card 144 when the smart card 144 is within the interface's communication field. In some embodiments, when the smart card 144 is within data communication range of the second computing device 106, the smart card 144 may synchronize the value of a counter stored in its memory with a counter stored by the second computing device 106. Further, in some embodiments, the smart card 144 may transmit a unique URL to the second computing device 106.

In some embodiments, the second computing device 106 may have data connectivity to a network, such as the Internet, via a wireless communication network, a cellular network, a wide area network, a local area network, a wireless personal area network, a wide body area network, or the like, or any combination thereof. In some embodiments, through this connectivity, the second computing device 106 may communicate with a server 110. For example, in some embodiments, the second computing device 106 may synchronize the counter stored in its memory with the server 110 and may transmit the unique URL received from the smart card 114 to the server 110 (e.g., the second computing device 106 may open the unique URL in a web browser or software application).

It should be apparent that the architecture described is only one example of an architecture for the second computing device 106, and that the second computing device 106 can have more or fewer components than shown, or a different configuration of components. The various components described above can be implemented in hardware, software, or a combination of both hardware and software, including one or more signal processing and/or application specific integrated circuits.

In some embodiments, the second computing device 106 may include an application such as a financial application 116 (or application software) associated with the entity. In some embodiments, the financial application 116 may include program code (or a set of instructions) that performs various operations (or methods, functions, processes, etc.), as further described herein.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the financial application 116 may enable users to interact with the entity, as well as access, view, and/or manage an existing financial account of the user. For example, in some embodiments, financial application 116 may allow the user 108 to request or start a communication session with an entity representative 118 associated with the entity. Additionally, in some embodiments, the financial application 116 may allow the entity or the entity representative 118 to communicate with the user 108. For example, in some embodiments, the entity representative 118 may send messages or push notifications to the user 108 via the financial application 116.

In some embodiments, as described above, the system 100 comprises a smart card 114 used as a physical token. However, in some embodiments, the physical token may be implemented in various physical forms. For example, in some embodiments, the physical token may be in a form that is easy to carry, such as a credit card, a debit card, a gift card, a building access card, a government-issued identification card, a fob, etc. In some embodiments, the physical token may take a form that may be attached to or incorporated into another article. For example, in some embodiments, the physical token may be a badge, a biometric device such as a fingerprint reader, a mobile device such as a wireless phone, etc.

Figure 2:
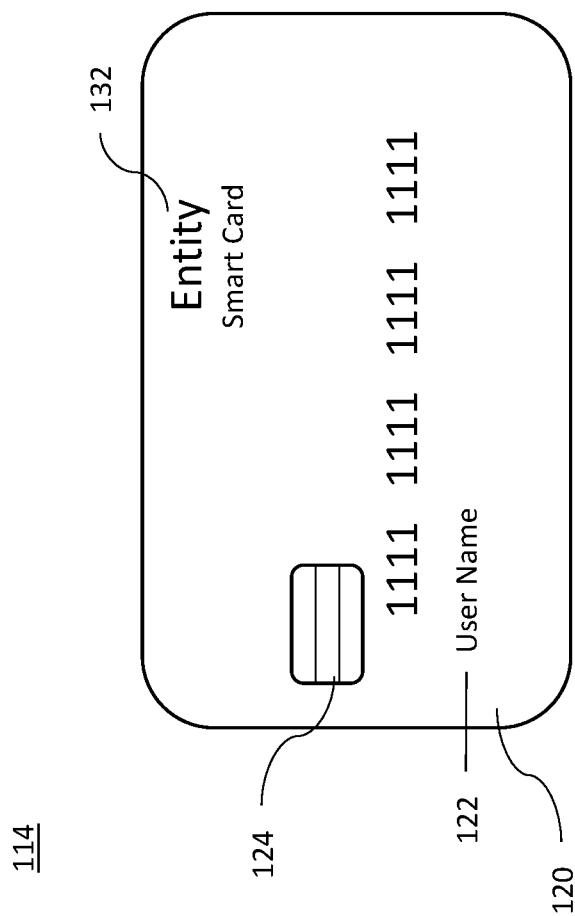
FIG. 2 illustrates an example of a user contactless smart card of the system of FIG. 1, according to one or more embodiments of the present disclosure.

FIG. 2 illustrates a smart card 114 according to exemplary embodiments of the present disclosure. In some embodiments, the smart card 114 may be a payment card issued by the entity. However, in other embodiments, the smart card 114 may not have payment capabilities. In some embodiments, the smart card 114 may be a contactless card. In some embodiments, the smart card 114 may comprise a substrate 120, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some embodiments, the smart card 114 may have physical characteristics compliant with the ID-1 format of the ISO/IEC 7810 standard, and the contactless card may otherwise be compliant with the ISO/IEC 14443 standard. However, it is understood that the smart card 114 according to the present disclosure may have different characteristics.

In some embodiments, the smart card 114 may include identification information 122 displayed on the front and/or back of the card, and a contact pad 124. In some embodiments, the entity information 132 or logo may be displayed on the front and/or back of the card. In some embodiments, the contact pad 124 may be configured to establish contact with another communication device, such as a user device, smart phone, laptop, desktop, or tablet computer. In some embodiments, the smart card 114 may also include processing circuitry, antenna and other components not shown in FIG. 2. In some embodiments, these components may be located behind the contact pad 124 or elsewhere on the substrate 120. In some embodiments, the smart card 114 may also include a magnetic strip or tape, which may be located on the back of the card (not shown in FIG. 2).

In some embodiments, the contact pad 124 may include processing circuitry for storing and processing information, including a microprocessor and a memory. It is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

In some embodiments, the memory may be a read-only memory, write-once read-multiple memory or read/write memory, e.g., RAM, ROM, and EEPROM, and the smart card 114 may include one or more of these memories. In some embodiments, the read-only memory may be factory programmable as read-only or one-time programmable. In some embodiments, one-time programmability provides the opportunity to write once then read many times. In some embodiments, a write once/read-multiple memory may be programmed at a point in time after the memory chip has left the factory. In some embodiments, once the memory is programmed, it may not be rewritten, but it may be read many times. In some embodiments, a read/write memory may be programmed and re-programed many times after leaving the factory. In some embodiments, a read/write memory may also be read many times.

In some embodiments, the memory may be configured to store one or more applets, one or more counters, and/or a customer identifier. In some embodiments, the one or more applets may comprise one or more software applications configured to execute on one or more contactless cards, such as Java Card applet. However, it is understood that applets are not limited to Java Card applets, and instead, in some embodiments, may be any software application operable on contactless cards or other devices having limited memory. In some embodiments, the one or more counters may comprise a numeric counter sufficient to store an integer. In some embodiments, the customer identifier may comprise a unique alphanumeric identifier assigned to a user of the smart card 114, and the customer identifier 136 may distinguish the user of the smartcard from other smartcard users. In some embodiments, the customer identifier may identify both a customer and an account assigned to that customer and may further identify the smart card 114 associated with the customer's account.

The processor and memory elements of the foregoing exemplary embodiments are described with reference to the contact pad, but the present disclosure is not limited thereto. It is understood that, in some embodiments, these elements may be implemented outside of the pad or entirely separate from it, or as further elements in addition to the microprocessor and the memory elements located within the contact pad 124.

In some embodiments, the smart card 114 may include one or more antennas. The one or more antennas may be placed within the smart card 114 and around the processing circuitry of the contact pad 124. For example, in some embodiments, the one or more antennas may be integral with the processing circuitry and the one or more antennas may be used with an external booster coil. As another example, in some embodiments, the one or more antennas may be external to the contact pad 124 and the processing circuitry.

As explained above, in some embodiments, the smart card 114 may be built on a software platform operable on smartcards or other devices having limited memory, such as JavaCard, and one or more or more applications or applets may be securely executed. In some embodiments, applets may be added to contactless cards to provide a one-time password (OTP) for multifactor authentication (MFA) in various mobile application-based use cases. In some embodiments, applets may be configured to respond to one or more requests, such as near field data exchange (NDEF) requests, from a reader, such as a mobile NFC reader, and produce an NDEF message that comprises a cryptographically secure OTP encoded as an NDEF text tag.

Figure 3:
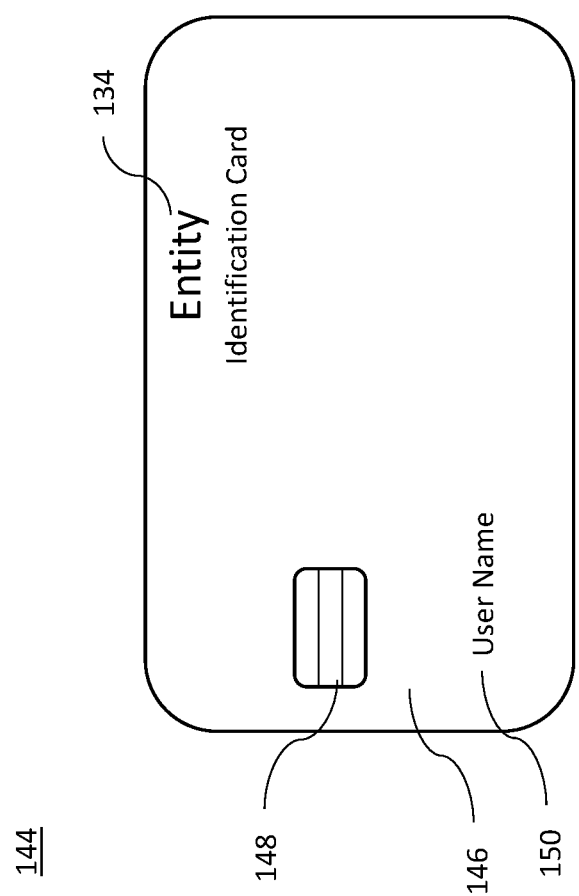
FIG. 3 illustrates an example of an entity representative contactless smart card of the system of FIG. 1, according to one or more embodiments of the present disclosure.

FIG. 3 illustrates a smart card 144 according to exemplary embodiments of the present disclosure. In some embodiments, the smart card 144 may be an identity card issued to the entity representative 118 by the entity. In some embodiments, the smart card 144 may be a contactless card. In some embodiments, the smart card 144 may have the same physical structure as the smart card 114, including a substrate 146.

In some embodiments, the smart card 144 may include a contact pad 148. In some embodiments, the smart card 144 may include identification information 150 displayed on the front and/or back of the card. In some embodiments, the smart card 144 may include entity information 134 displayed on the front and/or back of the card. In some embodiments, the contact pad 148 may be configured to establish contact with another communication device, such as the first computing device 102. In some embodiments, the smart card 144 may also include processing circuitry, antenna and other components not shown in FIG. 3. In some embodiments, these components may be located behind the contact pad 148 or elsewhere on the substrate 146. In some embodiments, the smart card 144 may also include a magnetic strip or tape, which may be located on the back of the card.

In some embodiments, the contact pad 148 may include processing circuitry for storing and processing information, including a microprocessor and a memory. It is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

In some embodiments, the memory may be a read-only memory, write-once read-multiple memory or read/write memory, e.g., RAM, ROM, and EEPROM, and the smart card 144 may include one or more of these memories. In some embodiments, the memory may be configured to store one or more applets, one or more counters, and a representative identifier, as discussed above with regard to smart card 144. The one or more applets may comprise one or more software applications configured to execute on one or more contactless cards, such as Java Card applet. However, it is understood that applets are not limited to Java Card applets, and instead may be any software application operable on contactless cards or other devices having limited memory. The one or more counters may comprise a numeric counter sufficient to store an integer. The representative identifier may comprise a unique alphanumeric identifier assigned to a user of the smart card 144, and the identifier may distinguish the representative of the smartcard from other smartcard users.

The processor and memory elements of the foregoing exemplary embodiments are described with reference to the contact pad, but the present disclosure is not limited thereto. It is understood that these elements may be implemented outside of the pad 148 or entirely separate from it, or as further elements in addition to the microprocessor and the memory elements located within the contact pad 148.

In some embodiments, the smart card 144 comprises NFC capabilities. In some embodiments, the smart card 144 may include one or more antennas and an external booster coil, as described with regard to the smart card 114. In some embodiments, the smart card 144 may be built on a software platform operable on smartcards or other devices having limited memory, such as JavaCard, and one or more or more applications or applets may be securely executed. Applets may be added to smartcards to provide a one-time password (OTP) for multifactor authentication (MFA) in various mobile application-based use cases. Applets may be configured to respond to one or more requests, such as near field data exchange (NDEF) requests, from a reader, such as a mobile NFC reader, and produce an NDEF message that comprises a cryptographically secure OTP encoded as an NDEF text tag.

Figure 4:
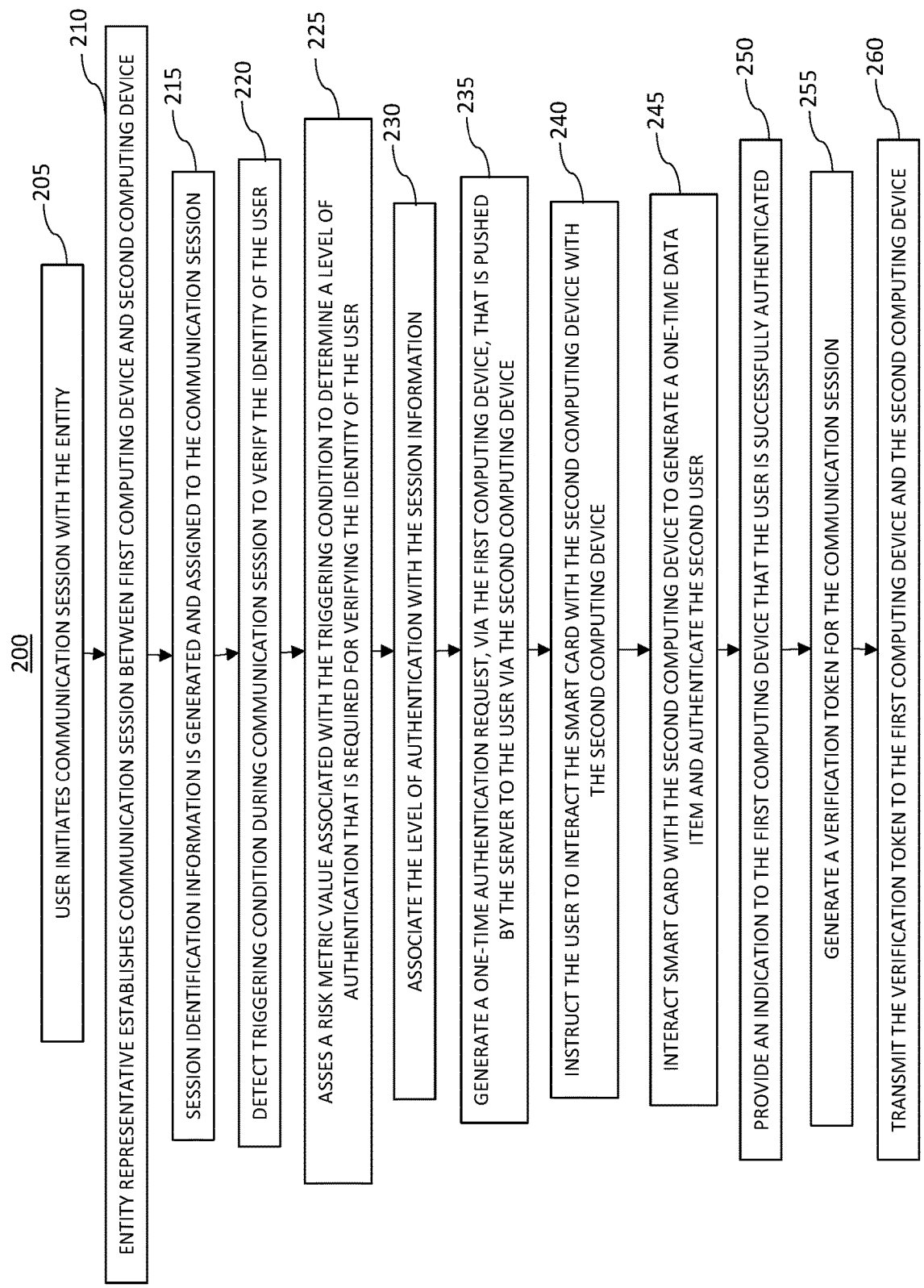
FIG. 4 is a process flow diagram illustrating an example of a computer-based process for role-based authentication of a user, according to one or more embodiments of the present disclosure.

FIG. 4 is a process flow diagram illustration of an example of an illustrated computer-mediated process for authenticating a user during a communication session, according to one or more embodiments of the present disclosure. The exemplary computer-mediated process 200 may be executed by software, hardware, or a combination thereof. For example, process 200 may be performed by including one or more components described in the system 100 of FIG. 1 (e.g., server 110, first computing device 102, second computing device 106 and smart card 114).

At step 205, the user 108 initiates a communication session with the entity (e.g., a financial institution). In some embodiments, the communication session may be initiated by the user 108 directly calling a call center at a customer service line via the second computing device 106. Alternatively, in some embodiments, the communication session may be initiated by the user 108 engaging a customer service contact link or icon in the financial application 116 associated with the entity. For example, in some embodiments, the user 108 may select the customer service contact icon and, in response, the financial application 116 may display the customer service phone number with a prompt to the user 108 to confirm that she would like to call the customer service line of the entity. In some embodiments, if the user 108 confirms, the financial application 116 may automatically cause the second computing device 106 to call the customer service phone number.

At step 210, an entity representative 118 accepts the call from the user 108, establishing a communication session between the first computing device 102 and the second computing device 106. In some embodiments, when the communication session is established, a back-channel communication link may be established between the server 110 and the second computing device 106 using a pre-validated communication channel. For example, the server 110 may store one or more pre-validated contact information for each user, including but not limited to phone numbers, Internet Mobile Equipment Identifier (IMEI), Internet Protocol (IP) addresses, etc.

At step 215, once the communication session is established, a session identification information may be generated and assigned to the communication session. In some embodiments, the session identification information may include a session identification (ID). In some embodiments, the session ID may be a unique number that the server 110 assigns to the user 108 for the duration of the communication session. In some embodiments, because the session ID may be a unique time-limited value, it is often difficult for hackers to successfully decode and intrude upon session communications. In some embodiments, the session ID may be stored as a cookie, form field, or URL (Uniform Resource Locator) at both the customer service agent and client devices. In some embodiments, the session ID may include at least one session interaction protocol certificate. Many servers use algorithms that involve more complex method of generating session identifiers, and thus forwarding communications using the session identifier adds a further layer of security to client/customer service agent communications.

At step 220, the first computing device 102 may detect a triggering condition during the communication session to verify an identity of the user 108. In some embodiments, the triggering condition may be that the communication session may exceed a predetermined threshold of duration. For example, the predetermined threshold may be from 30 seconds to 5 minutes such that if the communication session extends beyond that threshold, the triggering condition is met. In some embodiments, the predetermined threshold is 1 minute to 5 minutes, 2 minutes to 5 minutes, 3 minutes to 5 minutes, 4 minutes to 5 minutes, 30 seconds to 4 minutes, 30 seconds to 3 minutes, 30 seconds to 2 minutes, 30 seconds to 1 minute, 45 seconds to 2 minutes, 1 minute to 2 minutes or 2 minutes to 3 minutes. In some embodiments, the triggering condition may be that the identity of the user 108, or information associated with the user 108, matches a user identity or information associated with another known suspicious session ID. For example, in some embodiments, the entity may have a database that stores past suspicious session identification information and associated user information. In some embodiments, if the identity or information associated with the user 108 matches a user identity or information associated with one of the past suspicious sessions, the triggering condition may be met. In some embodiments, the triggering condition may simply be a request, by the user 108, to access information more than the general account information (e.g., account balance, payment due date, etc.). In some embodiments, the triggering condition may be a high-risk request, by the user 108, that may be typically associated with fraudulent activities. For example, in some embodiments, such high-risk requests may include, for example, a request for a financial account number, a social security number associated with the account, a change in address or name of the user associated with the account, etc.

At step 225, the first computing device 102 assesses a risk metric value associated with the triggering condition to determine a level of authentication that is required for verifying the identity of the user 108. In some embodiments, the risk metric value may indicate anywhere from a low level of risk to a high level of risk. In some embodiments, each triggering condition may be associated with a low level of risk such that no additional authentication may be required. In some embodiments, at least one triggering condition may be associated with certain high-risk services provided by the entity, such as accessing or modifying highly sensitive or personal information and may benefit from single or multi-factor authentication. Thus, prior to allowing the user 108 to access or modify highly sensitive or personal information, as can happen during customer support calls, it may be important to authenticate the user.

In some embodiments, the risk metric value may be determined automatically by the first computing device 102. In some embodiments, the risk metric value may be manually input into the first computing device 102 by the entity representative 118. For example, after receiving the user's request, the entity representative 118 may determine that the user request is a high-risk service that would benefit from additional user authentication. In some embodiments, once the entity representative 118 makes this determination, she may then input a determined risk metric value into the first computing device 102. In some embodiments, the entity representative may input the user request and any relevant information regarding the user request into the first computing device 102 and the first computing device 102 may automatically determine a risk metric value. In some embodiments, the risk metric value may be a value from one to five, where a risk metric value of one is a low level of risk and a risk metric value of five is a high level of risk. In some embodiments, the risk metric value may be any other type of metric or value.

In some embodiments, a level of authentication is automatically determined by the first computing device 102 based on the risk metric value assessed to each triggering condition. In some embodiments, the level of authentication is a low level of authentication. For example, in some embodiments, the system 100 may require that the user 108 simply provide her address or mother's maiden name to the entity representative 118 for authentication. In some embodiments, the level of authentication is a high level of authentication requiring additional security measures, as will be described in further detail below.

At step 230, the level of authentication may be associated with the session information. Specifically, in some embodiments, the session information may be updated by the first computing device 102 to include the level of authentication determined in step 225.

At step 235, when a client seeks access to a high-risk service, in some embodiments, the first computing device 102 may generate a one-time authentication request that the server 110 pushes to the user 108 via the second computing device 106. In some embodiments, the one-time authentication request may be a one-time data token. For example, in some embodiments, the one-time authentication request may be a 'push' notification. In some embodiments, the push notification includes the session identification information associated therewith. In some embodiments, the push notification may be issued by the server 110 to the second computing device 106, with the push notification including an authentication request using the smart card 114. In some embodiments, the push notification may be sent to the client using the pre-validated contact information, where a push notification includes a request for a particular form of authentication information (i.e., SwiftID, SMS code, cryptogram, etc.). In some embodiments, the push notification may be sent to the user 108 via the financial application 116. In some embodiments, by pushing the authentication request to the user 108 using a different channel than that over with the user seeks access, the opportunity for an imposter to be granted access to sensitive information is reduced. Additionally, by pushing the authentication request to the user 108 via the financial application 116, another level of user authentication is required when the user 108 is prompted to sign into the financial application 116.

As discussed above, in some embodiments, the push notification may prompt or instruct the user 108 to interact or engage the smart card 114 with the second computing device 106 to retrieve a cryptogram for authentication purposes. The prompt may be any manner of indicating to the client that they should engage the contactless card, including textual prompts, visual prompts, audible prompts or other available indication mechanisms.

At step 240, in some embodiments, the financial application 116 may display the push notification on a display screen of the second computing device 106. In some embodiments, the push notification includes a URL that opens the financial application 116. In some embodiments, when the financial application 116 is open, the user 108 is prompted to enter user account credentials (e.g., username, password) prior to continuing with the authentication request. Thus, sending the push notification authentication request via the financial application 116 may inherently require an extra layer of user authentication. In some embodiments, the push notification includes a URL that opens to a web page on a web browser. In some embodiments, the web page may require the user 108 to input user account login credentials prior to continuing with the authentication request.

At step 245, the user 108 engages the smart card 114 with the second computing device 106 to complete the authentication request and verify an identity of the user 108. In one aspect, the second computing device 106 uses NFC communication channels as described above to exchange messages with the smart card 114. Additionally, in some embodiments, the smart card 114 cooperates with the second computing device 106 to provide authentication through a combination of symmetric keys, symmetric cryptographic processing, and counters. In some embodiments, upon engagement with the second computing device 106, the smart card 114 increments the value of the counter stored in the smart card memory and then synchronizes this value with the counter stored on the second computing device 106. In some embodiments, the smart card 114 may generate a one-time data item, such as a unique URL, which may include the counter value and user identification. In some embodiments, the smart card 114 may also include location information, device-specific information or user-specific information in the URL. In some embodiments, upon generation of the unique URL, the smart card 114 may transmit the URL, via its contactless communication interface, to the financial application 116 on the second computing device 106. In some embodiments upon receipt of the unique URL, the financial application 116 may synchronize the value of its counter with the counter stored by the server 110. In some embodiments, the financial application 116 may then transmit the unique URL to the server 110. Thus, in some embodiments, the server 110 will have the value of the counter used to create the unique URL. In some embodiments, upon receipt of the URL, the server 110 may determine that the identity of the user is or is not authenticated successfully and transmit the results of the determination to the first computing device 102.

At step 250, if the identity of the user is authenticated successfully, the first computing device 102 may alert the entity representative 118, via a graphical user interface of the first computing device 102, that the user has been successfully verified and that the entity representative 118 may proceed with the user request.

At step 255, in some embodiments, the first computing device 102 may optionally generate a verification token for the communication session based on the session identification information and the successful authentication. In some embodiments, the verification token is, for example, a personal identification number (PIN) associated with the communication session. In some embodiments, once the PIN is generated, it may be stored on the server 110.

At step 260, the first computing device 102 may automatically transmit the verification token to each of the first computing device 102 and the second computing device 106. In some embodiments the first computing device 102 and the second computing device 106 may each display the PIN on a display screen or graphical user interface of the respective computing devices 102, 106. Thus, the entity representative 118 may ask the user 108 to read the PIN to the entity representative 118, adding another layer of authentication.

Figure 5:
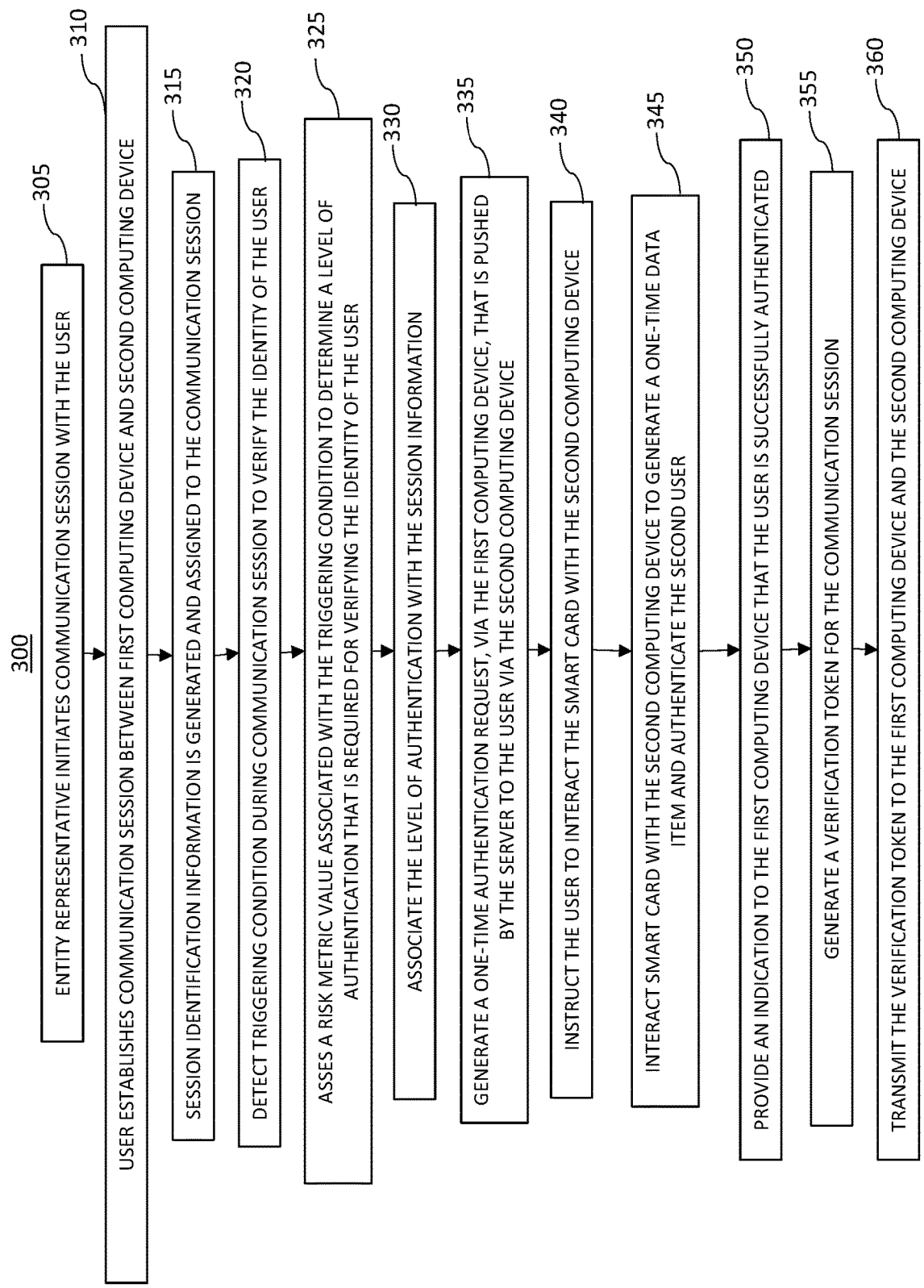
FIG. 5 is a process flow diagram illustrating an example of a computer-based process for role-based authentication of a user, according to one or more embodiments of the present disclosure.

FIG. 5 is a process flow diagram illustration of an example of an illustrated computer-mediated process for authenticating an entity representative during a communication session, according to one or more embodiments of the present disclosure. The exemplary computer-mediated process 300 may be executed by software, hardware, or a combination thereof. For example, process 300 may be performed by including one or more components described in the system 100 of FIG. 1 (e.g., server 110, first computing device 102, second computing device 106 and smart card 114). The exemplary computer-mediated process 300 may be the same as process 200, except with regard to steps 305 and 310.

At step 305, the entity representative 118 may initiate a communication session with the user 108. For example, in some embodiments, the entity representative 118 may log into an entity representative application (e.g., a customer service application) at, for example, an entity representative workstation and initiates a communication session with the user 108. In some embodiments, the communication session may be initiated via the first computing device 102. In some embodiments, the communication session may be initiated by the entity representative 118 directly calling the user 108 on a stored phone number associated with the user's account. In some embodiments, the communication session may be initiated via the first computing device 102.

At step 310, the user 108 engages the call from the entity representative 118, establishing the communication session between the first computing device 102 and the second computing device 106. In some embodiments, when the communication session is established, a back-channel communication link may be established between the server 110 and the second computing device 106 using a pre-validated communication channel. For example, the server 110 may store one or more pre-validated contact information for each user, including but not limited to phone numbers, Internet Mobile Equipment Identifier (IMEI), Internet Protocol (IP) addresses, etc.

As depicted in FIG. 5, steps 315-360 may be the same as steps 215-260 discussed above.

Figure 6:
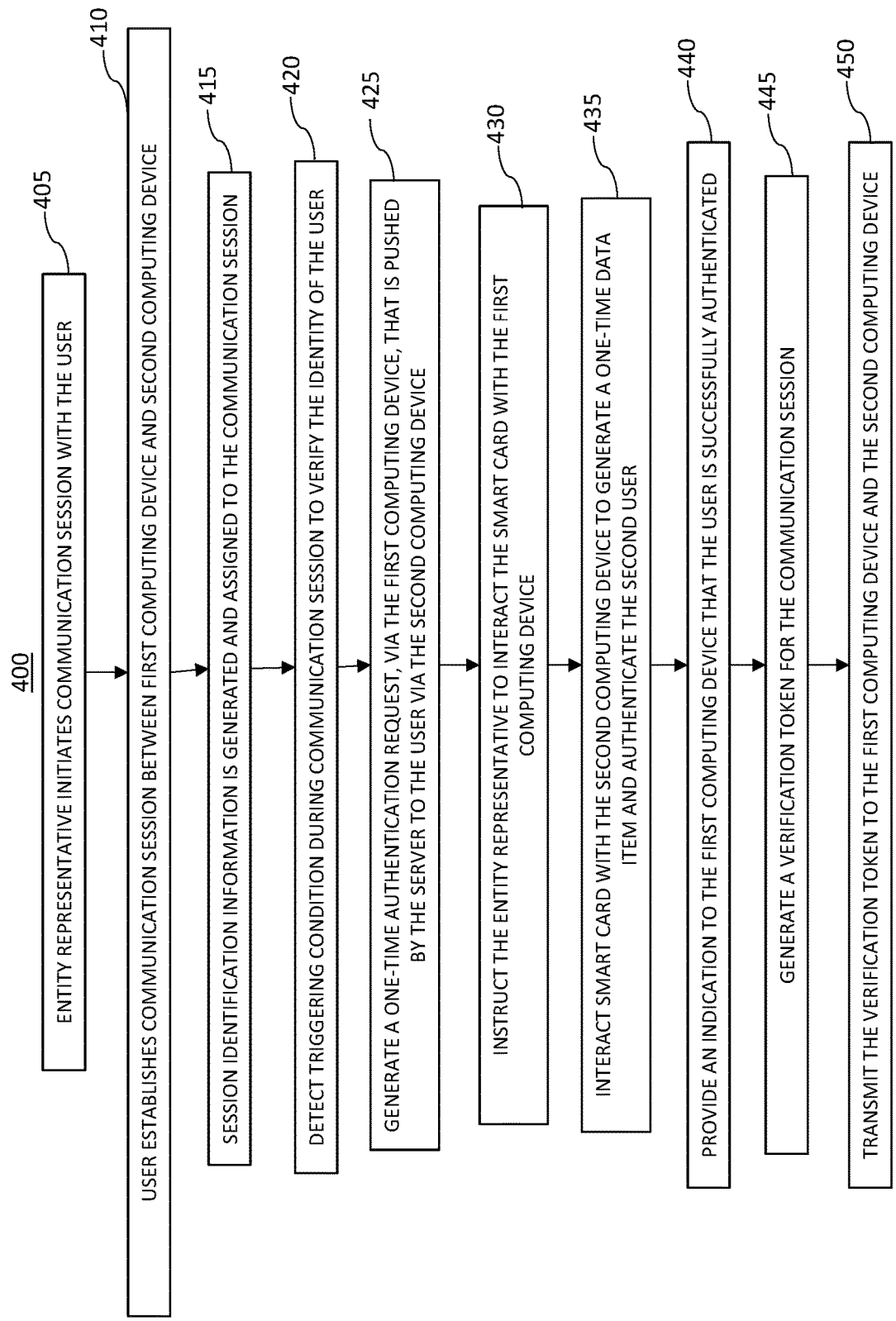
FIG. 6 is a process flow diagram illustrating an example of a computer-based process for role-based authentication of an entity representative, according to one or more embodiments of the present disclosure.

FIG. 6 is a process flow diagram illustration of an example of an illustrated computer-mediated process for authenticating an entity representative during a communication session, according to one or more embodiments of the present disclosure. The exemplary computer-mediated process 400 may be executed by software, hardware, or a combination thereof. For example, process 400 may be performed by including one or more components described in the system 100 of FIG. 1 (e.g., server 110, first computing device 102, second computing device 106 and smart card 114).

At step 405, the entity representative 118 may log into an entity representative application (e.g., a customer service application 130) at, for example, an entity representative workstation and initiates a communication session with the user 108. In some embodiments, the communication session may be initiated via the first computing device 102. In some embodiments, the communication session may be initiated by the entity representative 118 directly calling the user 108 on a stored phone number associated with the user's account. In some embodiments, the communication session may be initiated via the first computing device 102.

At step 410, the user 108 engages the call from the entity representative 118, establishing the communication session between the first computing device 102 and the second computing device 106. In some embodiments, when the communication session is established, a back-channel communication link may be established between the server 110 and the second computing device 106 using a pre-validated communication channel. For example, the server 110 may store one or more pre-validated contact information for each user, including but not limited to phone numbers, Internet Mobile Equipment Identifier (IMEI), Internet Protocol (IP) addresses, etc.

At step 415, once the communication session is established, a session identification information may be generated and assigned to the communication session. In some embodiments, the session identification information may include a session identification (ID). In some embodiments, the session ID may be a unique number that the server 110 assigns to the user 108 for the duration of the communication session. In some embodiments, because the session ID is a unique time-limited value, it is often difficult for hackers to successfully decode and intrude upon session communications. In some embodiments, the session ID may be stored as a cookie, form field, or URL (Uniform Resource Locator) at both the customer service agent and client devices. In some embodiments, the session ID may include at least one session interaction protocol certificate. Many servers use algorithms that involve more complex method of generating session identifiers, and thus forwarding communications using the session identifier adds a further layer of security to client/customer service agent communications.

At step 420, a triggering condition may be detected during the communication session to verify an identity of the entity representative 118. In some embodiments, the triggering condition may simply be that the user 108 requests that the entity representative 118 authenticate his identity so that the user 108 knows that the entity representative 118 is not a fraudulent actor. In some embodiments, the triggering condition may be that the communication session exceeds a predetermined threshold of duration. In some embodiments, the triggering condition may be a high-risk request, by the entity representative 118, for user information that is typically associated with fraudulent activities. For example, in some embodiments, such high-risk requests may include, for example, a request for an account number, a social security number associated with the account, a change in address or name of the user associated with the account, etc.

At step 425, when a triggering condition is identified, in some embodiments, the first computing device 102 may generate a one-time authentication request. In some embodiments, the one-time authentication request may be a one-time data token. For example, in some embodiments, the one-time authentication request may be a 'push' notification. In some embodiments, the push notification includes the session identification information associated therewith. In some embodiments, the push notification may be issued by the server 110 to the first computing device 102, with the push notification including an authentication request using the smart card 144. In some embodiments, the push notification includes a request for a particular form of authentication information (i.e., SwiftID, SMS code, cryptogram, etc.).

As discussed above, in some embodiments, the authentication request may prompt the entity representative 118 to engage the smart card 144 with the first computing device 102 to retrieve a cryptogram for authentication purposes. The prompt may be any manner of indicating to the entity representative 118 that he should engage the smart card 144, including textual prompts, visual prompts, audible prompts or other available indication mechanisms.

At step 430, the first computing device 106 displays the authentication request on a display screen of the second computing device 106, instructing the entity representative 118 to interact the smart card 144 with the first computing device 102.

At step 435, the entity representative 118 interacts or engages the smart card 144 with the first computing device 102 to complete the authentication request and verify an identity of the entity representative 118. In one aspect, the first computing device 102 uses NFC communication channels as described above to exchange messages with the smart card 144. Additionally, in some embodiments, the smart card 144 cooperates with the first computing device 102 to provide authentication through a combination of symmetric keys, symmetric cryptographic processing, and counters. In some embodiments, upon engagement with the first computing device 102, the smart card 144 increments the value of the counter stored in the smart card memory 156 and then synchronizes this value with the counter stored on the first computing device 102. In some embodiments, the smart card 144 may generate a one-time data item, or a unique URL, which may include the counter value and entity representative identification. In some embodiments, the smart card 144 may also include at least one of location information, device-specific information or entity representative-specific information in the URL. In some embodiments, upon generation of the unique URL, the smart card 144 may transmit the URL, via its contactless communication interface, to the customer service application on the first computing device 102. In some embodiments, upon receipt of the unique URL, the customer service application may synchronize the value of its counter with the counter stored by the server 110. In some embodiments, the customer service application may then transmit the unique URL to the server 110. Thus, in some embodiments, the server 110 will have the value of the counter used to create the unique URL. In some embodiments, upon receipt of the URL, the server 110 may determine that the identity of the entity representative 118 is or is not verified successfully and transmit the results of the determination to the second computing device 106.

At step 440, if the identity of the user is verified successfully, the second computing device 106 may alert the user 108, via a graphical user interface of the second computing device 106, that the entity representative 118 has been successfully verified and that the user 108 may proceed with the user request.

At step 445, in some embodiments, the second computing device 106 may optionally generate a verification token for the communication session based on the session identification information and the successful authentication. In some embodiments, the verification token is, for example, a personal identification number (PIN) associated with the communication session. In some embodiments, once the PIN is generated, it may be stored on the server 110.

At step 450, the second computing device 106 may automatically transmit the verification token to the first computing device 102. In some embodiments the first computing device 102 and the second computing device 106 may each display the PIN on a display screen or graphical user interface of the respective computing devices 102, 106. Thus, the user 108 may ask the entity representative 118 to read the PIN to the user 108, adding another layer of authentication.

Figure 7:
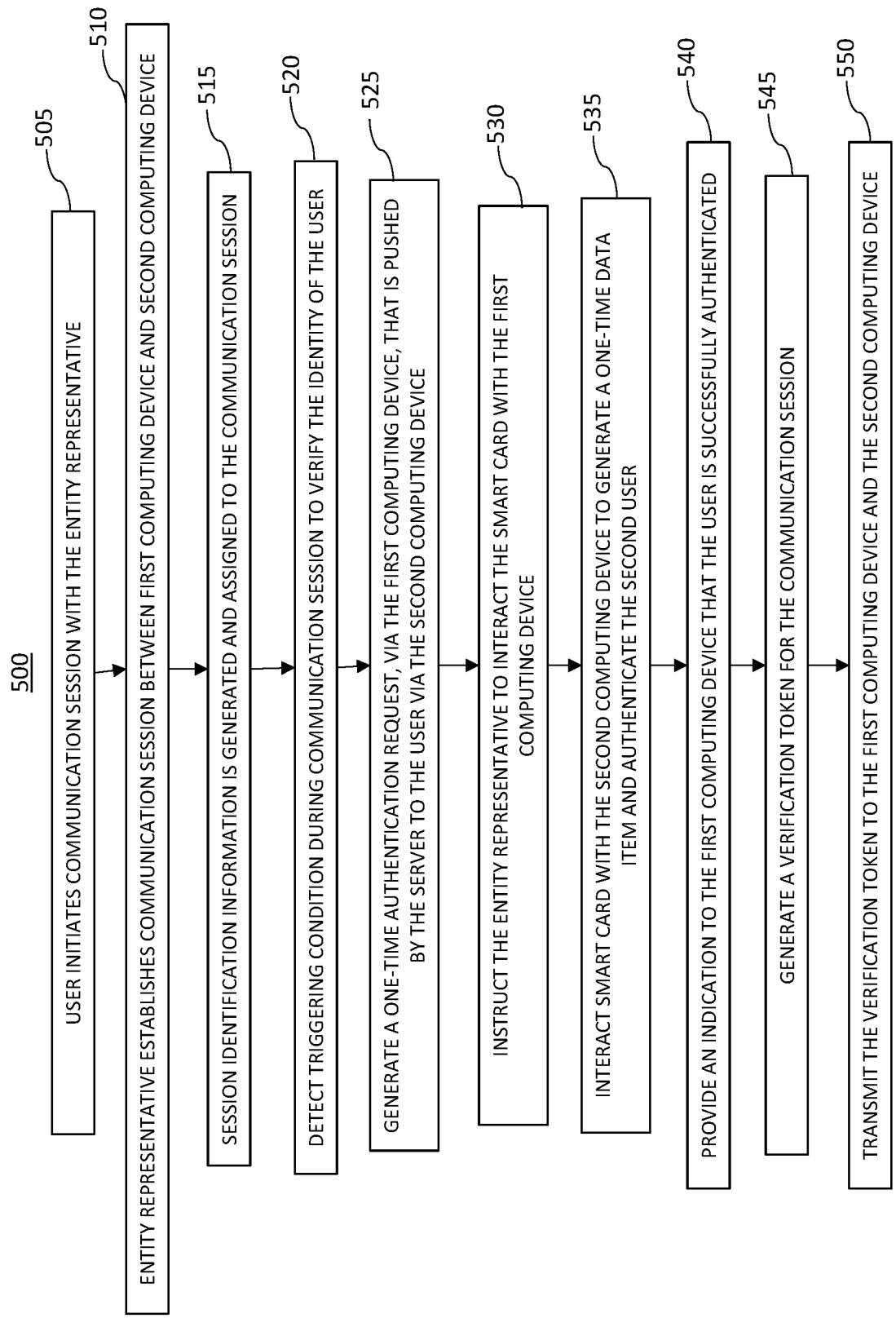
FIG. 7 is a process flow diagram illustrating an example of a computer-based process for role-based authentication of an entity representative, according to one or more embodiments of the present disclosure.

FIG. 7 is a process flow diagram illustration of an example of an illustrated computer-mediated process for authenticating an entity representative during a communication session, according to one or more embodiments of the present disclosure. The exemplary computer-mediated process 500 may be executed by software, hardware, or a combination thereof. For example, process 500 may be performed by including one or more components described in the system 100 of FIG. 1 (e.g., server 110, first computing device 102, second computing device 106 and smart card 114). The exemplary computer-mediated process 500 may be the same as process 400, except with regard to steps 505 and 510.

At step 505, the user 108 initiates a communication session with the entity (e.g., a financial institution). In some embodiments, the communication session may be initiated by the user 108 directly calling a call center at a customer service line via the second computing device 106. Alternatively, in some embodiments, the communication session may be initiated by the user 108 engaging a customer service contact link or icon in the financial application 116 associated with the entity. For example, in some embodiments, the user 108 may select the customer service contact icon and, in response, the financial application 116 may display the customer service phone number with a prompt to the user 108 to confirm that she would like to call the customer service line of the entity. In some embodiments, if the user 108 confirms, the financial application 116 may automatically cause the second computing device 106 to call the customer service phone number.

At step 510, an entity representative 118 accepts the call from the user 108, establishing a communication session between the first computing device 102 and the second computing device 106. In some embodiments, when the communication session is established, a back-channel communication link may be established between the server 110 and the second computing device 106 using a pre-validated communication channel. For example, the server 110 may store one or more pre-validated contact information for each user, including but not limited to phone numbers, Internet Mobile Equipment Identifier (IMEI), Internet Protocol (IP) addresses, etc.

As depicted in FIG. 7, steps 515-550 may be the same as steps 415-455 discussed above.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" may refer to a person who receives data provided by the data or service provider over the Internet in a browser session or may refer to an automated software application which receives the data and stores or processes the data.

Figure 8:
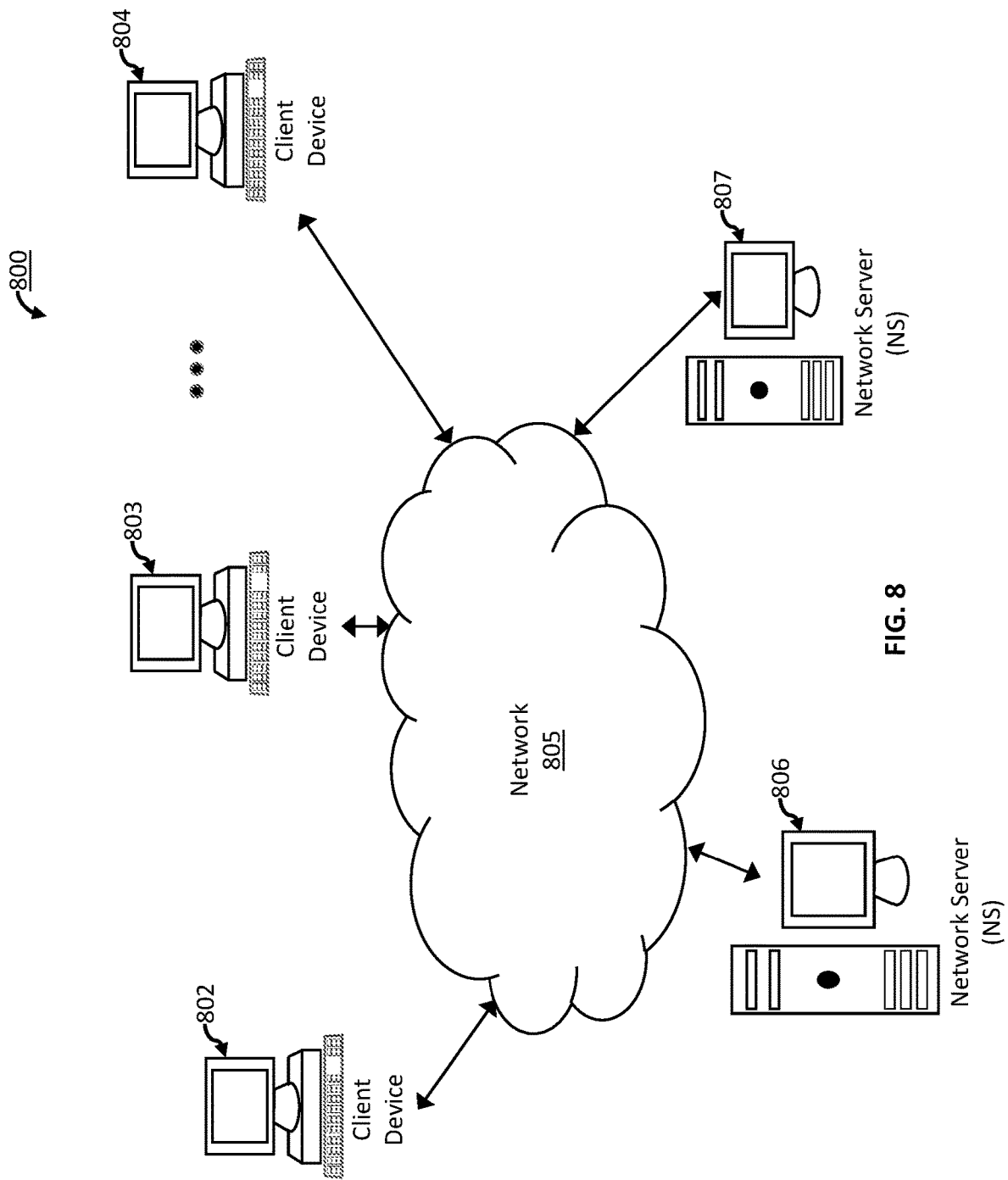
FIG. 8 is a block diagram illustrating an exemplary computer-based system and platform, according to one or more embodiments of the present disclosure.

FIG. 8 depicts a block diagram of an exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of members and concurrent transactions, as detailed herein. In some embodiments, the exemplary computer-based system and platform 800 may be based on a scalable computer and network architecture that incorporates varies strategies for assessing the data, caching, searching, and/or database connection pooling. An example of the scalable architecture is an architecture that may be capable of operating multiple servers.

In some embodiments, referring to FIG. 8, member computing device 802, member computing device 803 through member computing device 804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 802-804 may include may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 802-804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 805 may also include mass storage, such as network attached storage (NAS), a storage area network (SAN), a content delivery network (CDN) or other forms of computer or machine readable media.

In some embodiments, the exemplary server 806 or the exemplary server 807 may be a web server (or a series of servers) running a network operating system, examples of which may include but are not limited to Apache on Linux or Microsoft IIS (Internet Information Services). In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 801-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 9:
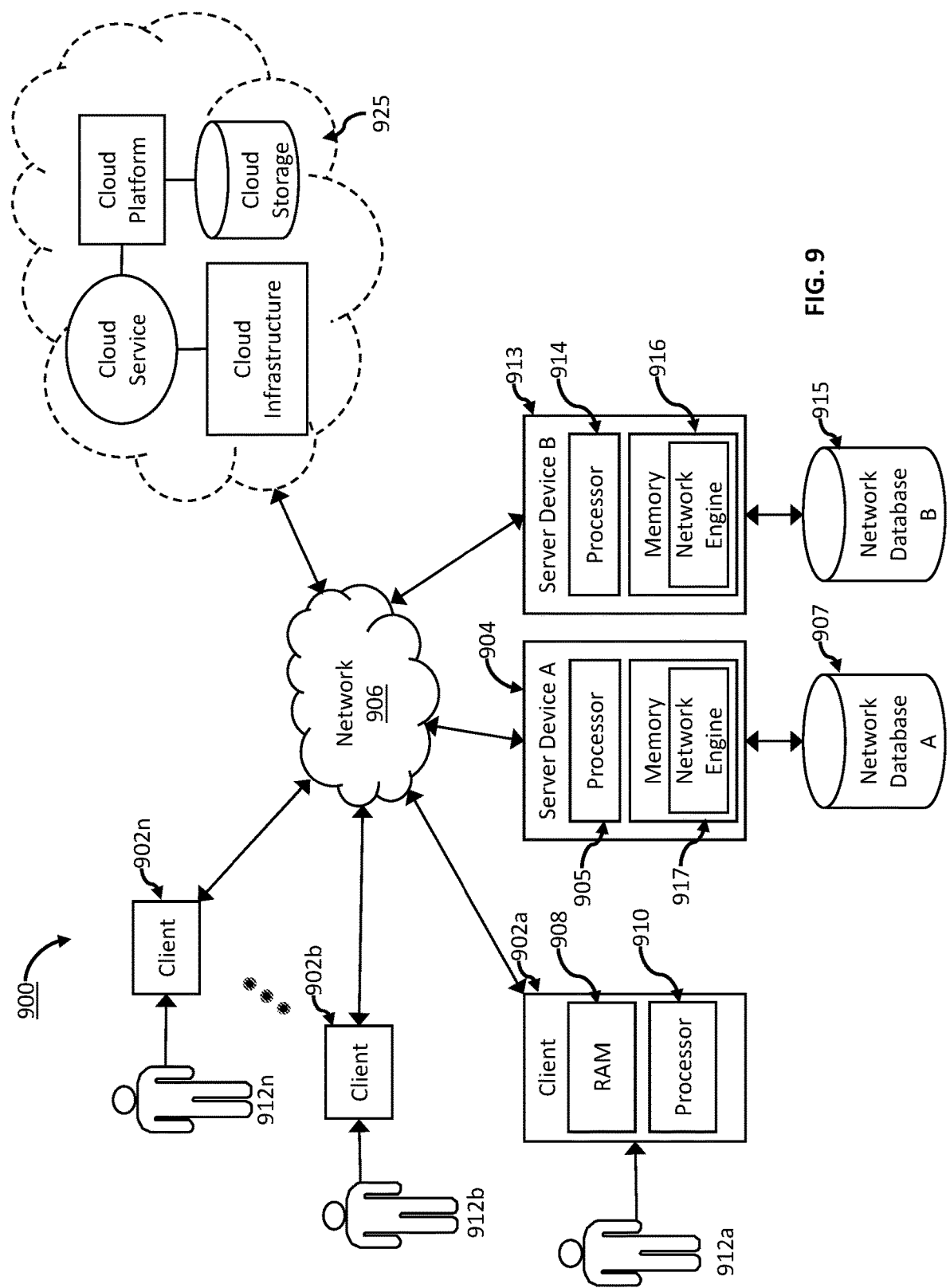
FIG. 9 is a block diagram illustrating another exemplary computer-based system and platform, according to one or more embodiments of the present disclosure.

FIG. 9 depicts a block diagram of another exemplary computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 902a, member computing device 902b through member computing device 902n shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client 902a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, member computing devices 902a through 902n may also include a number of external or internal devices such as a mouse, a CD-ROM, DVD, a physical or virtual keyboard, a display, or other input or output devices. In some embodiments, examples of member computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902a through 902n may be specifically programmed with one or more application programs in accordance with one or more principles/methodologies detailed herein. In some embodiments, member computing devices 902a through 902n may operate on any operating system capable of supporting a browser or browser-enabled application, such as Microsoft™, Windows™, and/or Linux. In some embodiments, member computing devices 902a through 902n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 902a through 902n, user 912a, user 912b through user 912n, may communicate over the exemplary network 906 with each other and/or with other systems and/or devices coupled to the network 906. As shown in FIG. 9, exemplary server devices 904 and 913 may include processor 905 and processor 914, respectively, as well as memory 917 and memory 916, respectively. In some embodiments, the server devices 904 and 913 may be also coupled to the network 906. In some embodiments, one or more member computing devices 902a through 902n may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
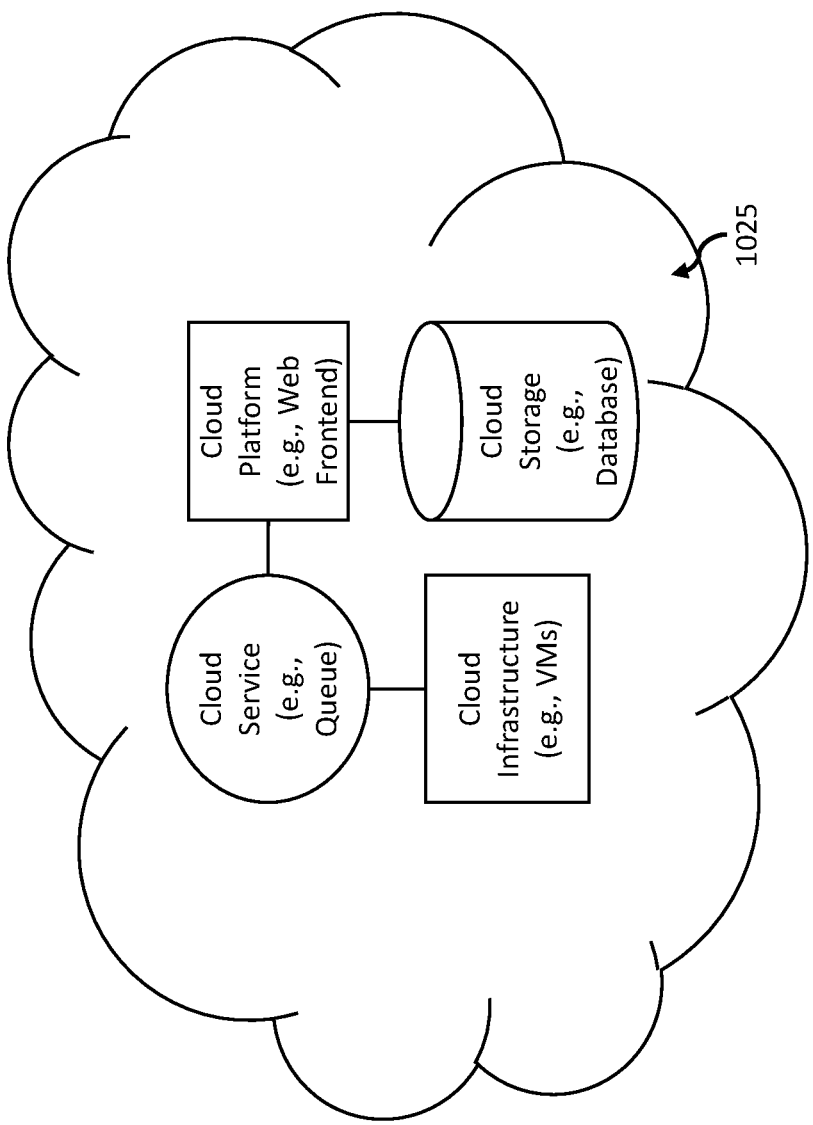
FIG. 10 is a schematic illustration of an exemplary implementation of a cloud computing/architecture(s) in which the exemplary inventive computer-based system and platform of the present disclosure may be specifically configured to operate, according to one or more embodiments of the present disclosure.
Figure 11:
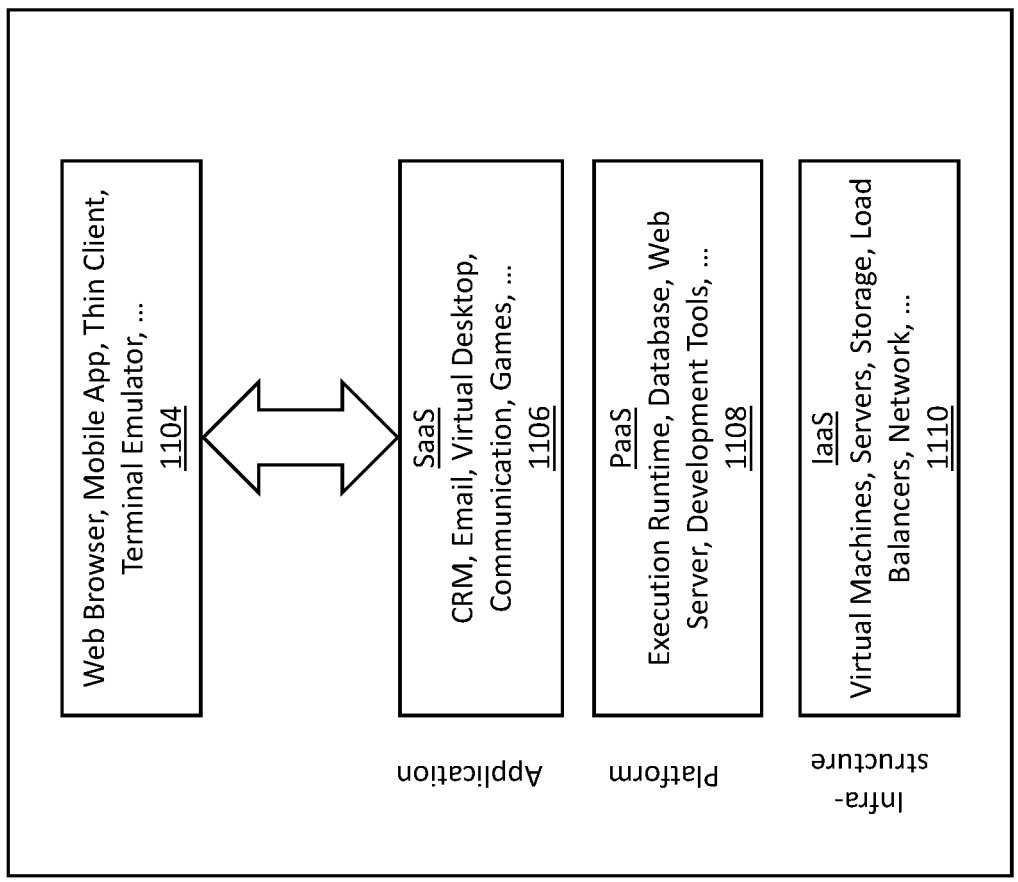
FIG. 11 is another schematic illustration of an exemplary implementation of a cloud computing/architecture(s) in which the exemplary inventive computer-based system and platform of the present disclosure may be specifically configured to operate, according to one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 925 such as, but not limiting to: infrastructure a service (IaaS) 1110, platform as a service (PaaS) 1108, and/or software as a service (SaaS) 1106 using a web browser, mobile app, thin client, terminal emulator or other endpoint 1104. FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A computer-implemented method including:
   detecting, by one or more processors, a communication session established between a first computing device of a first user and a second computing device of a second user, the communication session initiated by the first user,
   where the second user is associated with an entity;
   generating, by the one or more processors, session identification information for the communication session, the session identification information including at least a session ID;
   detecting, by the one or more processors, a triggering condition during the communication session to verify an identity of the first user;
   assessing, by the one or more processors, a risk metric associated with the triggering condition to determine a level of authentication for verifying the identity of the first user;

associating, by the one or more processors, the level of authentication with the session information;

causing, by the one or more processors, the second computing device to instruct the first user to interact a smart transaction card with the first computing device such that a one-time data item is transmitted from the smart transaction card to an application executing on the first computing device, the one-time data item dynamically generated by the smart transaction card, wherein the first user is authenticated via the application based at least in part on the level of authentication and the one-time data item;

receiving, by the one or more processors, an indication when the first user is successfully authenticated;

generating, by the one or more processors, a verification token for the communication session, the authentication result stored in association with the session information; and transmitting, by the one or more processors, the verification token to both the first computing device and the second computing device.

2. The computer-implemented method of clause 1, where the one-time data item includes a URL.

3. The computer-implemented method of clause 1, where the session identification information includes at least one session interaction protocol certificate.

4. The computer-implemented method of clause 1, where the at least one triggering condition includes at least one of the following:
a duration of the communication session exceeding a predetermined threshold of duration; and
the identity of the second user of the plurality of users matches a data point associated with a known suspicious session identification information within a pre-generated database of known suspicious session identification information.

5. The computer-implemented method of clause 1, where the risk metric value includes a value from one to five, where a risk metric value of one is a low level of risk and a risk metric value of five is a high level of risk.

6. The computer-implemented method of clause 1, where the smart card is a contactless smart card including NFC capabilities, where the smart card is configured to interact with an NFC device of the second computing device.

7. The computer-implemented method of clause 6, where when the smart card is within data communication range of the NFC device, the smart card is configured to synchronize a value of a counter stored therein with a counter stored in the second computing device.

8. The computer-implemented method of clause 1, further including generating, by the one or more processors, a one-time authentication request.

9. The computer-implemented method of clause 8, where the one-time authentication request includes a one-time data token including a push notification.

10. The computer-implemented method of clause 1, where the verification token is a PIN.

11. A computer-implemented method including:
detecting, by one or more processors, a communication session established between a first computing device of a first user and a second computing device of a second user, the communication session initiated by the first user,
where the first user is associated with an entity;
generating, by the one or more processors, session identification information for the communication session, the session identification information including at least a session ID;

detecting, by the one or more processors, a triggering condition during the communication session to verify an identity of the first user;

causing, by the one or more processors, the first computing device to instruct the first user to interact a smart transaction card with the first computing device such that a one-time data item is transmitted from the smart transaction card to an application executing on the first computing device, the one-time data item dynamically generated by the smart transaction card, where the first user is authenticated via the application based at least in part on the one-time data item;

receiving, by the one or more processors, an indication when the first user is successfully authenticated;

generating, by the one or more processors, a verification token for the communication session, the authentication result stored in association with the session information; and transmitting, by the one or more processors, the verification token to both the first computing device and the second computing device.

12. The computer-implemented method of clause 1, where the one-time data item includes a URL.

13. The computer-implemented method of clause 11, where the session identification information includes at least one session interaction protocol certificate.

14. The computer-implemented method of clause 11, where the at least one triggering condition includes at least one of the following:
a duration of the communication session exceeding a predetermined threshold of duration; and
the identity of the second user of the plurality of users matches a data point associated with a known suspicious session identification information within a pre-generated database of known suspicious session identification information.

15. The computer-implemented method of clause 11, where the smart card is a contactless smart card including NFC capabilities, where the smart card is configured to interact with an NFC device of the second computing device.

16. The computer-implemented method of clause 15, where when the smart card is within data communication range of the NFC device, the smart card is configured to synchronize a value of a counter stored therein with a counter stored in the first computing device.

17. The computer-implemented method of clause 16, where the one-time authentication request includes a one-time data token including a push notification.

18. The computer-implemented method of clause 11, where the verification token may be a PIN.

19. A system may include:
a non-transient computer memory, storing software instructions;
at least one processor of a computing device associated with a user;
where, when the at least one processor executes the software instructions, the first computing device is programmed to:
detect a communication session established between a first computing device of a first user and a second computing device of a second user, the communication session initiated by the second user, where the first user is associated with an entity;

generate session identification information for the communication session, the session identification information including at least a session ID;

detect a triggering condition during the communication session to verify an identity of the first user;

cause the first computing device to instruct the first user to interact a smart transaction card with the first computing device such that a one-time data item is transmitted from the smart transaction card to an application executing on the first computing device, the one-time data item dynamically generated by the smart transaction card, where the first user is authenticated via the application based at least in part on the one-time data item;

receive an indication when the first user is successfully authenticated;

generate a verification token for the communication session, the authentication result stored in association with the session information; and transmit the verification token to both the first computing device and the second computing device.

20. The system of clause 19, where the smart card is a contactless smart card including NFC capabilities, where the smart card is configured to interact with an NFC device of the first computing device.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added or any desired steps may be eliminated).

What is claimed:

1. A computer-implemented method comprising:

detecting, by one or more processors, a communication session established between a first computing device of a first user and a second computing device of a second user, the communication session initiated by the first user, wherein the second user is associated with an entity;

generating, by the one or more processors, session identification information for the communication session, the session identification information including at least a session identifier (ID);

detecting, by the one or more processors, a triggering condition during the communication session to verify an identity of the first user;

assessing, by the one or more processors, a risk metric associated with the triggering condition to determine a level of authentication for verifying the identity of the first user;

associating, by the one or more processors, the level of authentication with the session information;

causing, by the one or more processors, the second computing device to instruct the first user to interact a smart card with the first computing device such that a one-time data item is transmitted from the smart card to an application executing on the first computing device, the one-time data item dynamically generated by the smart card, wherein the first user is authenticated via the application based at least in part on the level of authentication and the one-time data item;

receiving, by the one or more processors, an indication when the first user is successfully authenticated;

generating, by the one or more processors, a verification token for the communication session, the verification token stored in association with the session information; and transmitting, by the one or more processors, the verification token to both the first computing device and the second computing device;

wherein the session identification information comprises at least one session interaction protocol certificate.

2. The method of claim 1, wherein the one-time data item comprises a uniform resource locator (URL).

3. The computer-implemented method of claim 1, wherein the triggering condition comprises at least one of the following:

a duration of the communication session exceeding a predetermined threshold of duration; and the identity of the second user matches a data point associated with a known suspicious session identification information within a pre-generated database of known suspicious session identification information.

4. The computer-implemented method of claim 1, wherein the risk metric comprises a value from one to five, wherein a risk metric of one is a low level of risk and a risk metric of five is a high level of risk.

5. The computer-implemented method of claim 1, wherein the smart card is a contactless smart card comprising Near-field communication (NFC) capabilities, wherein the smart card is configured to interact with an NFC device of the second computing device.

6. The computer-implemented method of claim 5, wherein when the smart card is within data communication range of the NFC device, the smart card is configured to synchronize a value of a counter stored therein with a counter stored in the second computing device.

7. The computer-implemented method of claim 1, further comprising generating, by the one or more processors, a one-time authentication request.

8. The computer-implemented method of claim 7, wherein the one-time authentication request comprises a one-time data token comprising a push notification.

9. The computer-implemented method of claim 1, wherein the verification token is a Personal Identification Number (PIN).

10. A computer-implemented method comprising:

detecting, by one or more processors, a communication session established between a first computing device of a first user and a second computing device of a second user, the communication session initiated by the first user, wherein the first user is associated with an entity;

generating, by the one or more processors, session identification information for the communication session, the session identification information including at least a session identifier (ID);

detecting, by the one or more processors, a triggering condition during the communication session to verify an identity of the first user;

causing, by the one or more processors, the first computing device to instruct the first user to interact a smart transaction card with the first computing device such that a one-time data item is transmitted from the smart card to an application executing on the first computing device, the one-time data item dynamically generated by the smart card, wherein the first user is authenticated via the application based at least in part on the one-time data item;

receiving, by the one or more processors, an indication when the first user is successfully authenticated;

generating, by the one or more processors, a verification token for the communication session, the verification token stored in association with the session information; and transmitting, by the one or more processors, the verification token to both the first computing device and the second computing device;

wherein the session identification information comprises at least one session interaction protocol certificate.

11. The computer-implemented method of claim 1, wherein the one-time data item comprises a uniform resource locator (URL).

12. The computer-implemented method of claim 10, wherein the triggering condition comprises at least one of the following:

a duration of the communication session exceeding a predetermined threshold of duration; and the identity of the second user matches a data point associated with a known suspicious session identification information within a pre-generated database of known suspicious session identification information.

13. The computer-implemented method of claim 10, wherein the smart card is a contactless smart card comprising Near-field communication (NFC) capabilities, wherein the smart card is configured to interact with an NFC device of the second computing device.

14. The computer-implemented method of claim 13, wherein when the smart card is within data communication range of the NFC device, the smart card is configured to synchronize a value of a counter stored therein with a counter stored in the first computing device.

15. The computer-implemented method of claim 10, further comprising generating, by the one or more processors, a one-time authentication request.

16. The computer-implemented method of claim 15, wherein the one-time authentication request comprises a one-time data token comprising a push notification.

17. A system, comprising:

a non-transient computer memory, storing software instructions;

at least one processor of a computing device associated with a user;

wherein, when the at least one processor executes the software instructions, the first computing device is programmed to:

detect a communication session established between a first computing device of a first user and a second computing device of a second user, the communication session initiated by the second user, the first user associated with an entity;

generate session identification information for the communication session, the session identification information including at least a session identifier (ID);

detect a triggering condition during the communication session to verify an identity of the first user;

cause the first computing device to instruct the first user to interact a smart card with the first computing device such that a one-time data item is transmitted from the smart card to an application executing on the first computing device, the one-time data item dynamically generated by the smart card, wherein the first user is authenticated via the application based at least in part on the one-time data item;

receive an indication when the first user is successfully authenticated;

generate a verification token for the communication session, the verification token stored in association with the session information; and transmit the verification token to both the first computing device and the second computing device;

wherein the session identification information comprises at least one session interaction protocol certificate.

18. The system of claim 17, wherein the smart card is a contactless smart card comprising Near-field communication (NFC) capabilities, wherein the smart card is configured to interact with an NFC device of the first computing device.

* * * * *